(12) United States Patent
Thomas

(10) Patent No.: US 7,862,082 B2
(45) Date of Patent: Jan. 4, 2011

(54) AIR BAG INFLATION BAFFLE

(75) Inventor: Scott D. Thomas, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 157 days.

(21) Appl. No.: 12/194,765

(22) Filed: Aug. 20, 2008

(65) Prior Publication Data

US 2010/0045006 A1 Feb. 25, 2010

(51) Int. Cl.
B60R 21/205 (2006.01)
B60R 21/233 (2006.01)
B60R 21/26 (2006.01)

(52) U.S. Cl. .................... 280/740; 280/742; 280/743.2; 280/729

(58) Field of Classification Search ................ 280/736, 280/740, 742, 743.2, 729
See application file for complete search history.

(56) References Cited

U.S. PATENT DOCUMENTS

| 5,160,164 | A | * | 11/1992 | Fischer et al. | 280/743.2 |
| 5,172,933 | A | * | 12/1992 | Strasser | 280/740 |
| 5,282,646 | A | * | 2/1994 | Melvin et al. | 280/729 |
| 5,573,270 | A | * | 11/1996 | Sogi et al. | 280/740 |
| 5,577,765 | A | * | 11/1996 | Takeda et al. | 280/729 |
| 5,593,179 | A | * | 1/1997 | Maruyama | 280/740 |
| 5,845,935 | A | * | 12/1998 | Enders et al. | 280/743.2 |
| 5,918,902 | A | * | 7/1999 | Acker et al. | 280/743.1 |
| 5,941,559 | A | * | 8/1999 | Rudolf et al. | 280/740 |
| 6,089,599 | A | * | 7/2000 | Schimmoller et al. | 280/740 |
| 6,340,174 | B1 | * | 1/2002 | Takagi et al. | 280/736 |
| 6,361,067 | B1 | * | 3/2002 | Varcus et al. | 280/729 |
| 6,371,509 | B1 | * | 4/2002 | Ellerbrok et al. | 280/729 |
| 6,439,605 | B2 | * | 8/2002 | Ariyoshi | 280/739 |
| 6,439,606 | B2 | * | 8/2002 | Okada et al. | 280/743.1 |
| 6,568,708 | B2 | * | 5/2003 | Miodek et al. | 280/740 |
| 6,626,459 | B2 | * | 9/2003 | Takimoto et al. | 280/731 |
| 6,669,229 | B2 | * | 12/2003 | Thomas | 280/732 |
| 6,692,023 | B2 | * | 2/2004 | Tokita et al. | 280/743.1 |
| 6,776,434 | B2 | | 8/2004 | Ford et al. | |
| 6,962,363 | B2 | | 11/2005 | Wang et al. | |
| 7,000,947 | B2 | * | 2/2006 | Kumagai et al. | 280/743.1 |
| 7,052,042 | B2 | * | 5/2006 | Sato et al. | 280/743.1 |
| 7,066,487 | B2 | * | 6/2006 | Sullivan et al. | 280/729 |
| 7,073,818 | B2 | * | 7/2006 | Hasebe | 280/729 |
| 7,121,576 | B2 | | 10/2006 | DePottey et al. | |
| 7,128,337 | B2 | * | 10/2006 | Kwon | 280/743.1 |
| 7,147,247 | B2 | * | 12/2006 | Hayakawa | 280/740 |
| 7,147,248 | B2 | * | 12/2006 | Lee | 280/740 |
| 7,195,279 | B2 | * | 3/2007 | Rose et al. | 280/740 |

(Continued)

Primary Examiner—Ruth Ilan
Assistant Examiner—Nicole Verley

(57) ABSTRACT

An air bag includes a bag base wall having a mouth registering with an inflator and extending rearward along an instrument panel and toward the seated occupant. Spaced apart left and right sidewalls connect the bag base wall with a top wall and an occupant facing wall, thereby defining upper and lower torso restraining portions. An internal baffle has a baffle base wall sewn to the bag base wall rearwardly of the mouth and a left side baffle portion and a right side baffle portion attached to and extending from the baffle base wall and attached to the sidewalls of the air bag so that inflation gas impinges on the baffle and divides into left and right flow streams flowing on opposite sides of the baffle base wall and directed downwardly into the lower torso restraining portion and away from the upper torso restraining portion.

20 Claims, 7 Drawing Sheets

U.S. PATENT DOCUMENTS

| | | | |
|---|---|---|---|
| 7,195,281 | B2 | 3/2007 | Williams et al. |
| 7,210,702 | B2 * | 5/2007 | Soderquist ................... 280/740 |
| 7,255,367 | B2 * | 8/2007 | Bauer et al. ............... 280/743.1 |
| 7,264,268 | B2 * | 9/2007 | Ehrke ......................... 280/729 |
| 7,311,324 | B2 * | 12/2007 | Okada et al. ............. 280/728.2 |
| 7,347,445 | B2 * | 3/2008 | Choi ........................... 280/729 |
| 7,396,043 | B2 * | 7/2008 | Choi et al. ............... 280/743.1 |
| 7,398,992 | B2 * | 7/2008 | Marriott ..................... 280/729 |
| 7,407,185 | B2 * | 8/2008 | Maripudi et al. ......... 280/743.1 |
| 7,530,597 | B2 * | 5/2009 | Bito ............................ 280/742 |
| 7,597,356 | B2 * | 10/2009 | Williams .................... 280/739 |
| 7,604,252 | B2 * | 10/2009 | Heitplatz et al. ......... 280/730.1 |
| 7,695,002 | B2 * | 4/2010 | Choi ........................... 280/729 |
| 2001/0040368 | A1 | 11/2001 | Okada et al. |
| 2002/0017774 | A1 * | 2/2002 | Igawa ...................... 280/728.2 |
| 2002/0135164 | A1 * | 9/2002 | Thomas ..................... 280/732 |
| 2003/0020264 | A1 | 1/2003 | Abe et al. |
| 2003/0057691 | A1 * | 3/2003 | Tokita et al. ............. 280/743.2 |
| 2003/0151233 | A1 * | 8/2003 | Varcus ....................... 280/729 |
| 2003/0178821 | A1 | 9/2003 | Schneider et al. |
| 2003/0201628 | A1 * | 10/2003 | Roychoudhury et al. .... 280/729 |
| 2005/0029781 | A1 * | 2/2005 | Enders et al. ............... 280/732 |
| 2005/0052008 | A1 | 3/2005 | Rose et al. |
| 2005/0248132 | A1 * | 11/2005 | Wheelwright ............... 280/729 |
| 2007/0108750 | A1 * | 5/2007 | Bauer et al. ................. 280/740 |
| 2007/0145730 | A1 * | 6/2007 | Choi ........................... 280/740 |
| 2008/0073893 | A1 * | 3/2008 | Schneider ................... 280/740 |
| 2009/0302587 | A1 * | 12/2009 | Thomas ................... 280/743.2 |

\* cited by examiner

AIR BAG INFLATION BAFFLE

FIELD OF THE INVENTION

The present invention relates to an inflatable air bag and more particularly an air bag having an internal inflation baffle for dividing and directing air bag inflation gas for improved air bag deployment.

BACKGROUND OF THE INVENTION

It is known in motor vehicles to provide an air bag assembly which inflates to restrain a vehicle occupant. An air bag inflator is mounted on the instrument panel of the vehicle body forwardly of the vehicle seat. The air bag is mounted on the inflator so that activation of the inflator will generate inflation gas to fill the air bag and expand the air bag from a folded up stored condition to an inflated position in which the air bag fills the space between the windshield, the instrument panel and the seated occupant. The typical air bag includes an upper portion for restraining the upper torso and a lower portion for restraining the lower torso.

It is desirable to shape the air bag and to control the inflation of the air bag in a manner to optimize the occupant restraining characteristics of the air bag assembly. In addition, it is desirable to control the inflation of the air bag in a way that will minimize the loading of the inflating air bag on the windshield and the instrument panel structure.

It would be desirable to provide a new and improved air bag that would provide improved control of the inflation of the air bag in a manner to minimize the loading on the windshield and optimize the placement and deployment of the air bag into its occupant restraining position.

SUMMARY OF THE INVENTION

An inflatable air bag receives inflation gas from an inflator mounted on an instrument panel to inflate the air bag in the region between a windshield and the instrument panel and a seated occupant. The air bag includes a bag base wall having a mouth registering with the inflator and extending rearward along the instrument panel and toward the seated occupant. Spaced apart left and right sidewalls connect the bag base wall with a top wall and an occupant facing wall, thereby defining an upper torso restraining portion of the inflated air bag and a lower torso restraining portion. An internal baffle is provided within the air bag and is a flap of material having a baffle base wall sewn to the bag base wall rearwardly of the mouth and a left side baffle portion and a right side baffle portion attached to and extending from the baffle base wall and attached to the spaced apart sidewalls of the air bag so that the inflation gas impinges on the baffle and is divided into left and right flow streams flowing on opposite sides of the baffle base wall and directed downwardly into the lower torso restraining portion and away from the upper torso restraining portion.

It should be understood that the detailed description and specific examples, while indicating exemplary embodiments of the invention, are intended for purposes of illustration only and not intended to limit the scope of the invention.

BRIEF DESCRIPTION OF THE DRAWINGS

The present invention will become more fully understood from the detailed description and the accompanying drawings.

DETAILED DESCRIPTION OF THE EXEMPLARY EMBODIMENTS

The following description of certain exemplary embodiments is exemplary in nature and is not intended to limit the invention, its application, or uses.

Figure 1:
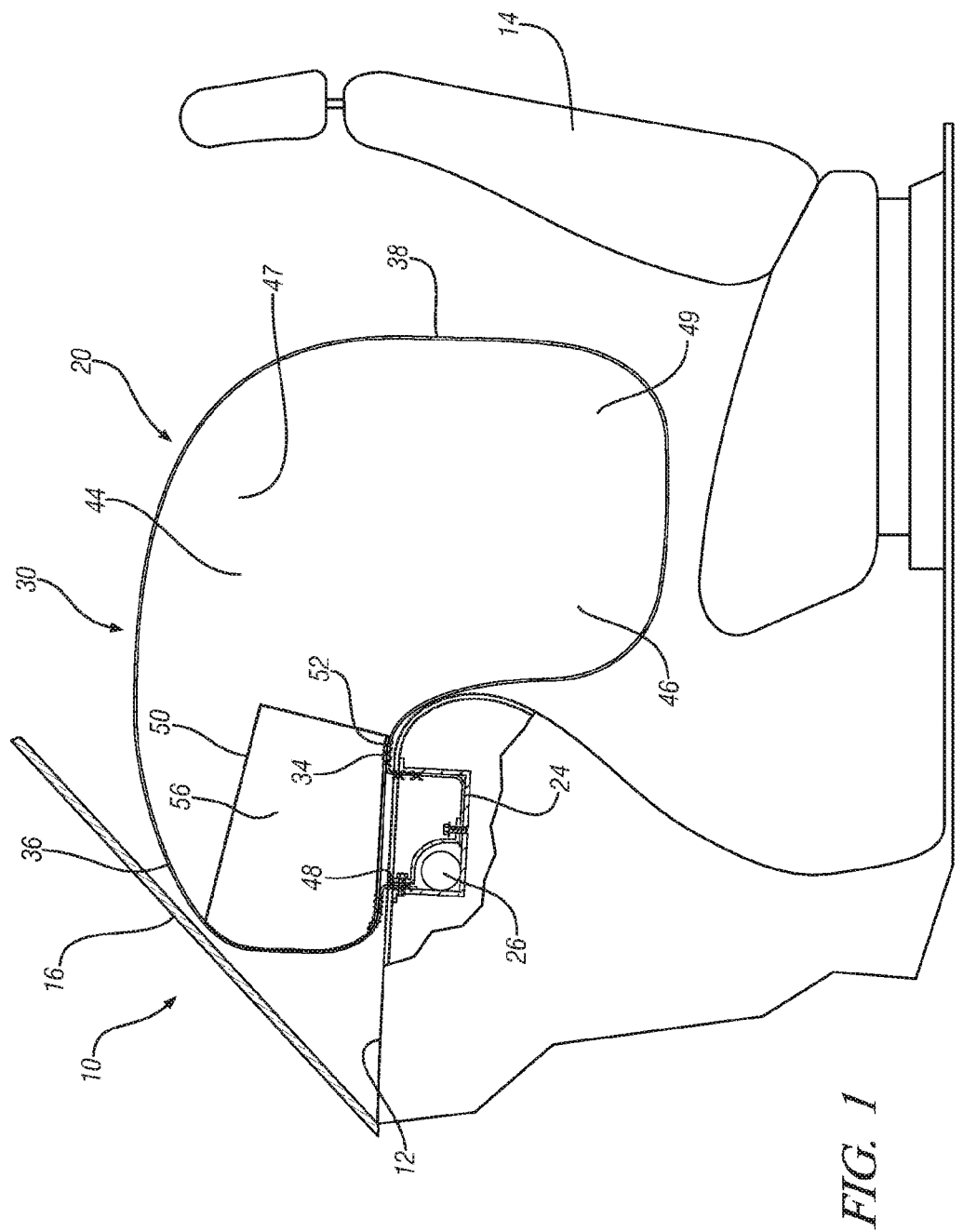
FIG. 1 is a side elevation view of an inflated air bag assembly having a baffle according to the invention.

Referring to FIG. 1, it is seen that a typical motor vehicle generally indicated at 10 includes an instrument panel 12 that is mounted forwardly of a vehicle seat 14. A windshield glass 16 intersects with the instrument panel 12 and rises at an angle therefrom toward the vehicle roof.

An airbag assembly, generally indicated at 20 is mounted on the instrument panel 12. The airbag assembly 20 includes an inflator housing 24 mounted within an opening provided in the instrument panel 12. The inflator housing 24 houses an inflator 26 which can be activated to generate inflation gas. An airbag, generally indicated at 30, is constructed of sheets of fabric materials, and, as well known in the airbag industry is normally folded in a stored up condition atop the inflator 26 and within the inflator housing 24. Upon activation of the inflator 26, inflation gas is generated to inflate the airbag 30 to its inflated condition as shown in FIGS. 1, 2 and 3.

Figure 2:
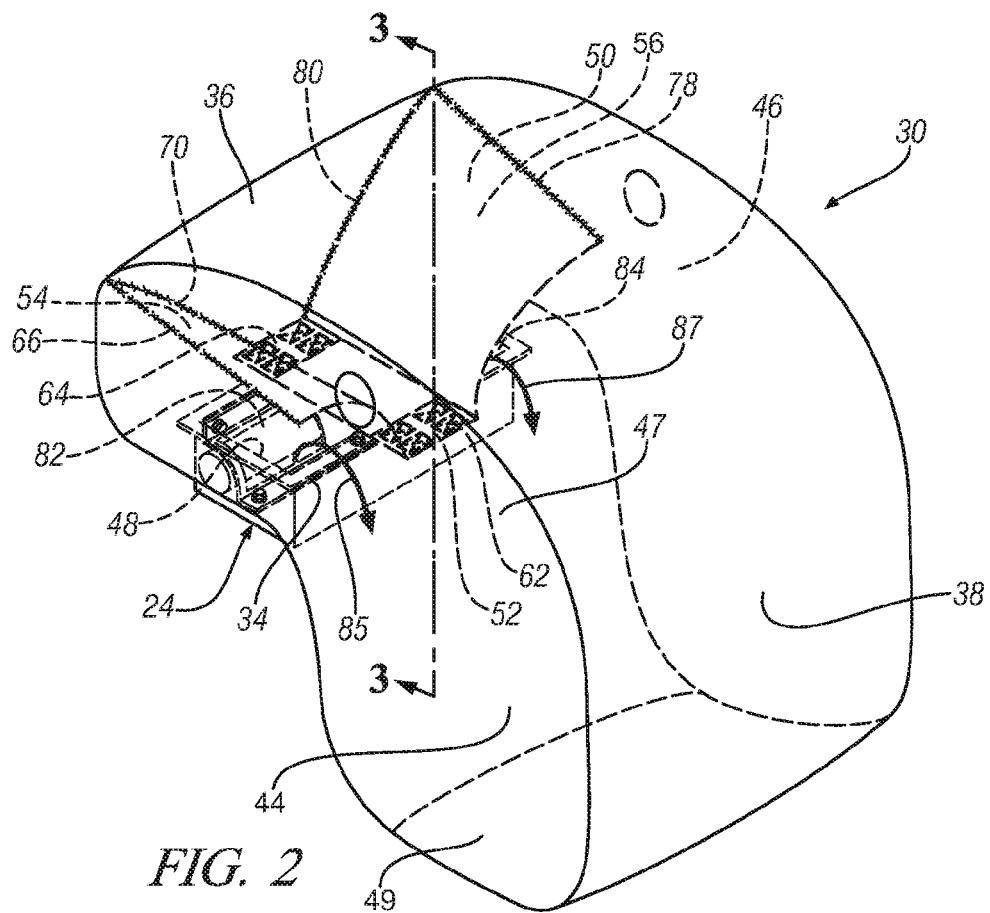
FIG. 2 is a perspective view of the inflated air bag assembly of FIG. 1.
Figure 3:
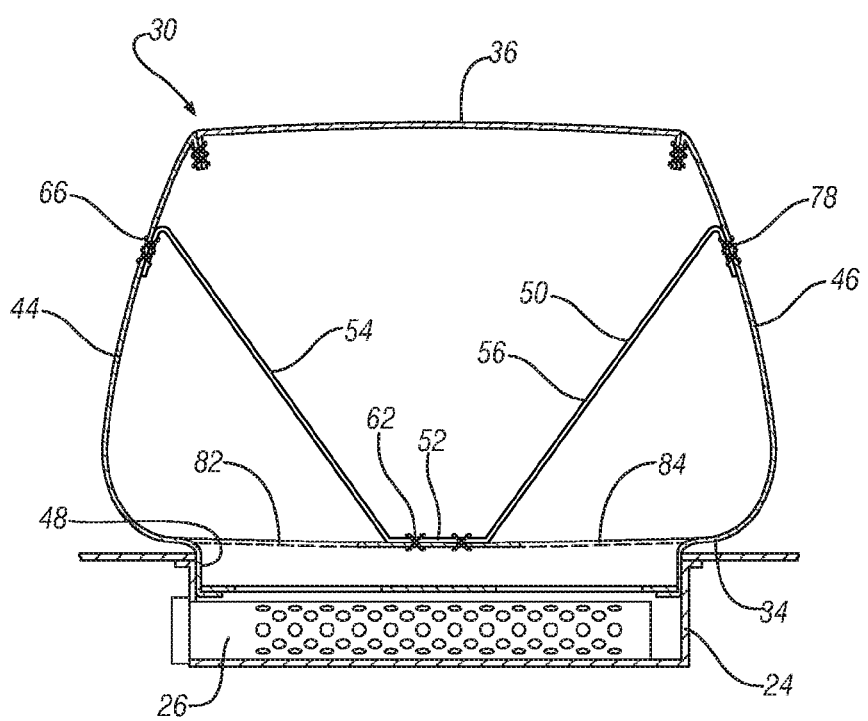
FIG. 3 is a section view taken in the direction of arrows 3-3 of FIG. 2.

As best seen in FIGS. 1, 2, and 3, the airbag 30 includes generally a bag base wall 34 that is suitably mounted on the inflator housing 24, a top wall 36 that may contact with the windshield 16 and extends rearwardly toward the vehicle seat 14, an occupant facing wall 38 that faces toward the seat 14, and spaced apart left and right sidewalls 44 and 46 that extend between and connect together the bag base wall 34, the top wall 36 and the occupant facing wall 38.

The bag base wall 34 has a mouth 48 that registers with the inflator housing 24 so that inflation gas from the inflator 26 is communicated into the air bag 30. As seen in FIGS. 1 and 2 the inflated air bag 30 has an upper torso restraining portion 47, and the bag base wall 34 extends downwardly along the instrument panel and then rearward toward the seat 14 to define a lower torso restraining portion 49.

As shown in FIGS. 1, 2 and 3, a baffle 50 is provided inside the air bag 30 for directing and dividing the air flow inflation gas. In particular as best seen in FIGS. 2, and 3, the baffle 50 is a flap of air bag material that includes a baffle base wall 52, a left side baffle portion 54, and a right side baffle portion 56. The baffle base wall 52 of the baffle 50 is sewn to the bag base wall 34 of the air bag 30 by stitches 62 located rearwardly of the inflator housing 24, and sewn to the bag base wall 34 by stitches 64 located forwardly of the inflator housing 24. As best seen in FIGS. 2 and 3, the left side baffle portion 54 rises from the baffle base wall 52 and has its upper end sewn to the left sidewall 44 of the air bag 30 by stitches 66. In addition, as shown in FIG. 2 the forwardmost end of the left side baffle portion 54 is sewn to the forwardmost part of the airbag top wall 36 by stitches at 70. The right side baffle portion 56 is sewn to the right sidewall 46 by stitches at 78 and sewn to the top wall 36 by stitches at 80.

As best seen in FIGS. 2 and 3, the baffle base wall 52 of the baffle 50 overlies the mouth 48 of the air bag base wall 34, thereby dividing the mouth 48 into a left mouth 82 and a right mouth 84. Accordingly, the inflation gas is divided into a left flow path or stream 85 and a right flow path or stream 87. The inflation gas of the left flow path 85 is then directed both rearward and downward by the left side baffle portion 54, and the inflation gas of the right flow path 87 is directed both rearward and downwardly by the right side baffle portion 56. In this manner, the baffle 50 is effective to divide and direct the inflation gas more in the downward and rearward direction to expedite filling of the lower torso restraining portion 49, and delay somewhat the flow of inflation gas toward the windshield and into the upper torso restraining portion 47 because the inflation gas can only reach the upper torso restraining portion 47 by passing through the left flow path 85 and right flow path 87.

Of course the air bag of FIGS. 1, 2, and 3 may also be provided with the various tethers, vents, and active vents known in the air bag art to further enable optimization of the air bag inflation. The tethers and vents can be provided in either the baffle, or in the air bag. In addition, the angle and placement and size of the baffle may be adjusted as desired. For example, FIG. 3 shows the left and right baffle walls 54 and 56 rising at an angle of about 45 degrees so that they intersect with and are attached to the sidewalls 44 and 46. However, the left and right baffle walls 54 and 56 can rise at a steeper angle and be attached to the top wall 36.

Figure 4:
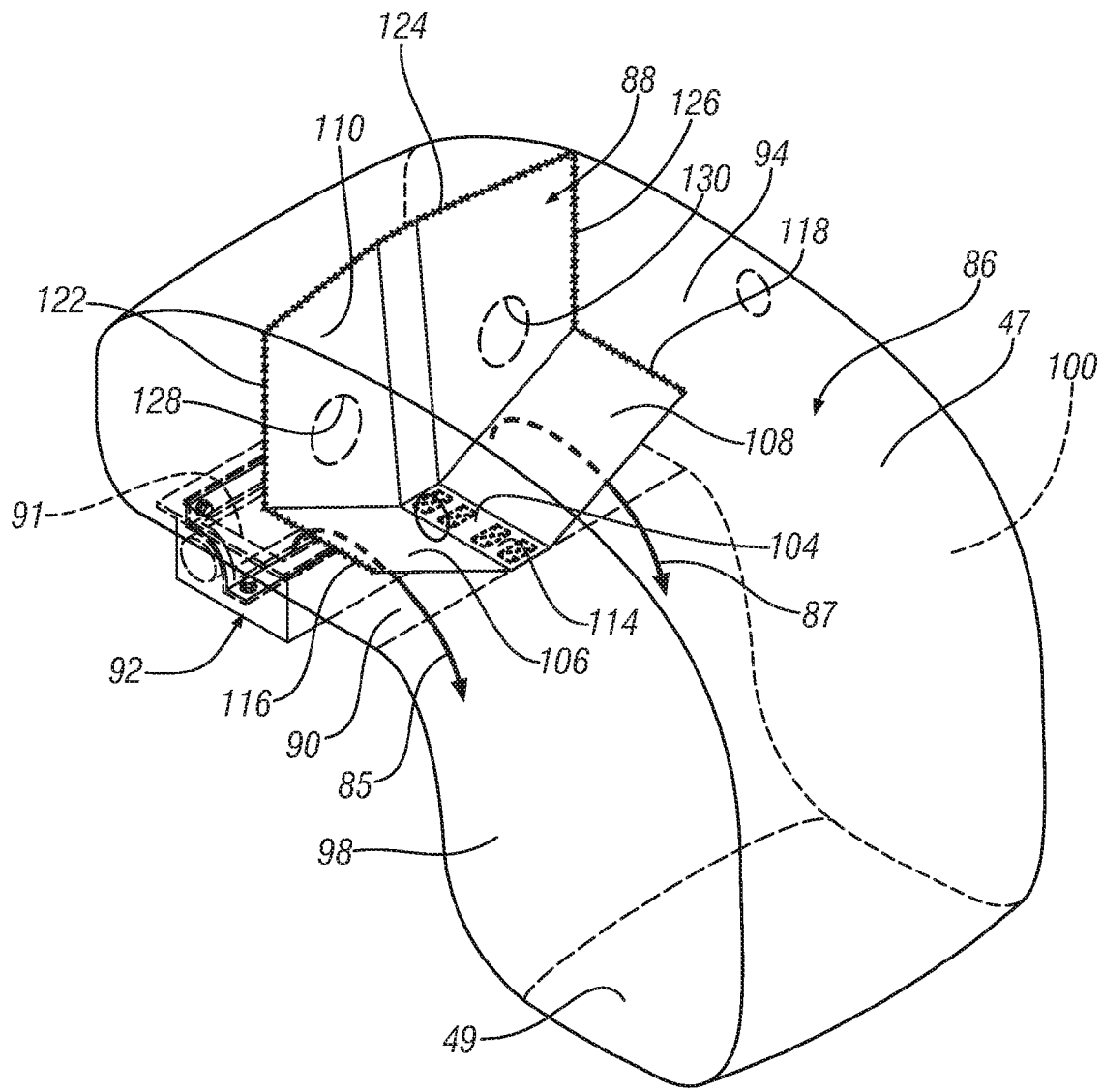
FIG. 4 is a view similar to FIG. 2 but showing a second embodiment of the baffle of this invention.

FIG. 4 shows another embodiment of the invention. In FIG. 4, an air bag 86 has an internal baffle 88. The air bag 86 has a bag base wall 90 having a mouth 91 that registers with an inflator housing 92, a top wall 94, and left and right sidewalls 98 and 100. The baffle 88 is a generally rectangular shaped piece of air bag material that is sewn inside the air bag 86 in a manner shown in FIG. 4 to provide a baffle base wall 104, left side baffle portion 106, right side baffle portion 108, and an upright baffle wall 110. In particular, the baffle base 104 is sewn to the bag base wall 90 rearwardly of the inflator housing 92 by stitches at 114. The left side baffle wall 106 and right side baffle wall 108 rise from the baffle base 104 at an angle and are sewn respectively to the left and right sidewalls 98 and 100 by stitches at 116 and 118. The upright baffle wall 110 is attached to the left sidewall 98 by stitches at 122, to the top wall 94 by stitches at 124, and to the right sidewall 100 by stitches at 126.

Upon activation of the inflator, the inflation gas rises through the air bag mouth 91 is then divided in a left hand flow stream 85 and a right hand flow stream 87 by the baffle base wall 104, with the upright baffle wall 110 blocking the flow of inflation gas directly toward the upper restraining portion 47 of the air bag 86, so that inflation is first directed downwardly and rearwardly into the lower torso restraining portion 49. The angles and size and orientation of the baffle 88 can be adjusted as desired. In addition, openings such as 128 and 130 may be provided in the upright baffle wall 110 to permit some of the inflation gas to pass through the baffle 88 and into the upper torso restraining portion 47 without having to pass through the left and right flow streams 85 and 87.

Figure 5:
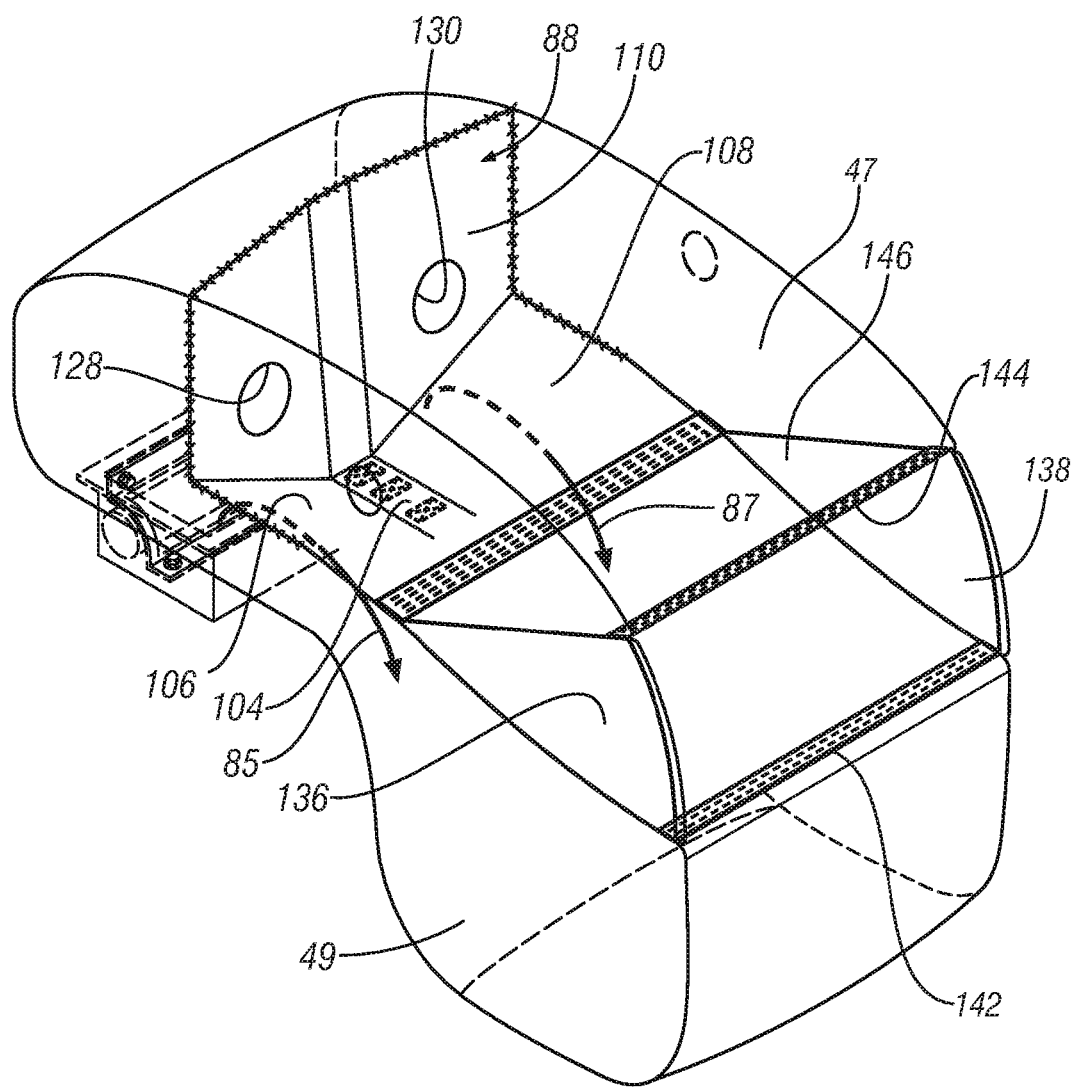
FIG. 5 is a view similar to FIGS. 2 and 4 and showing yet another embodiment of the baffle of this invention.

FIG. 5 is another embodiment of the invention in which an internal baffle is provided similar to the baffle of FIG. 4 and having like elements identified by like reference numerals. However, in FIG. 5, it is seen that the baffle base wall 104 and the left and right hand baffle portions 106 and 108 have been continued rearward toward the seat forming a lower tether panel 136 that is sewn on to the occupant facing air bag wall 138 by stitches 142, and then proceeds upwardly to another line of stitches at 144, and then rearwardly to form an upper tether panel 146. The lower tether panel 136 and the upper tether panel 146 cooperate to establish the furthest inflated position of the occupant facing air bag wall 138. In addition, the lower tether panel 136 establishes a barrier to inflation gas flow so that the filling of the upper torso restraining portion 47 of the air bag occurs via the flow of inflation gas from the lower torso restraining portion 49 upwardly around the side edges of the lower tether panel 136 and the upper tether panel 146. It will be understood that the lower tether panel 136 and the upper tether panel 146 are not necessarily integral with the baffle portion, and can be separate pieces of material.

Figure 6:
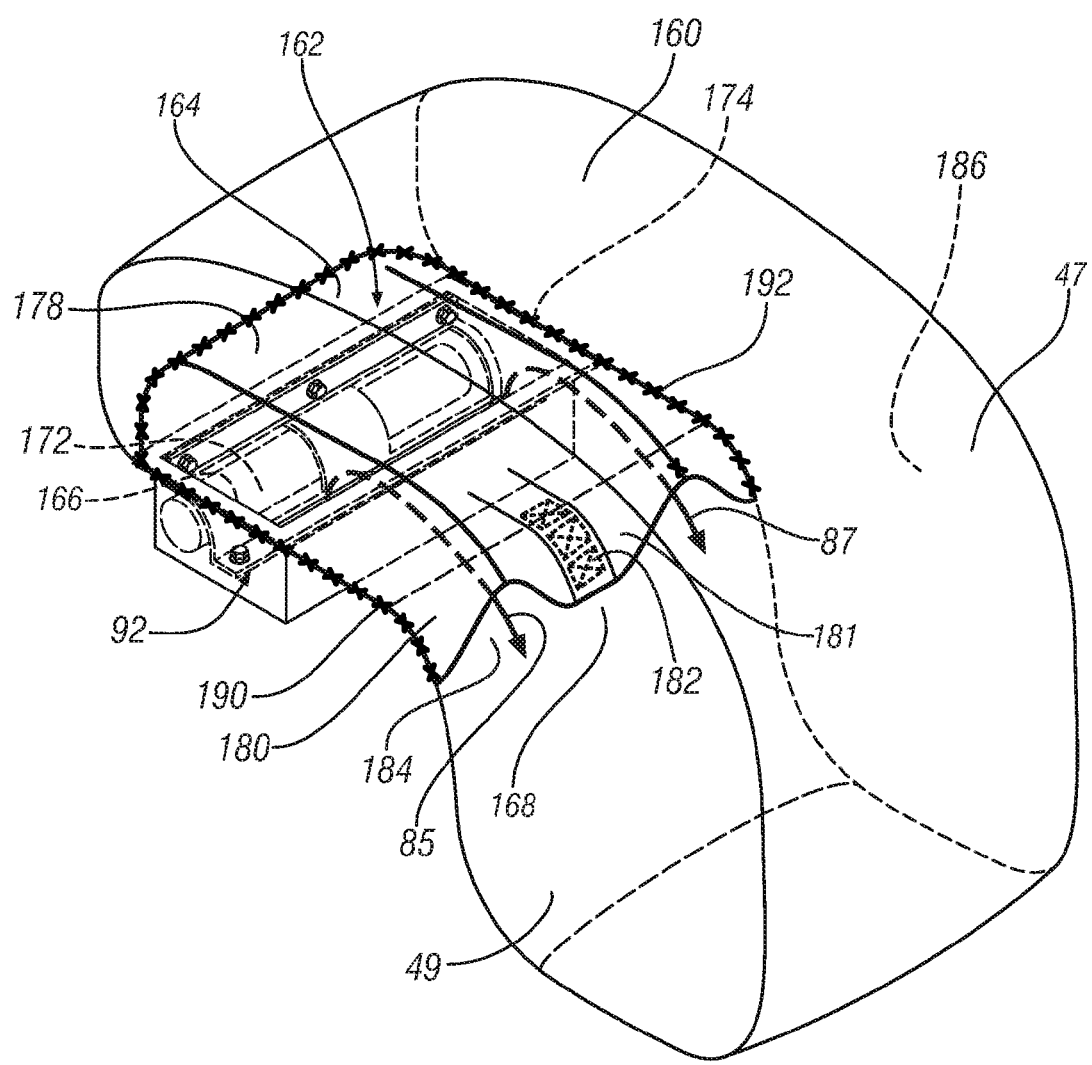
FIG. 6 shows yet another embodiment of the baffle of this invention.

Referring to FIG. 6, another embodiment of the invention is shown in which an air bag 160 has an internal baffle 162 with a box-shaped cap portion 164 that sits atop the mouth 166 of the bag base wall 168. The box-shaped cap portion 164 has left and right cap sidewalls 172 and 174, and a baffle top cap wall 178. The baffle top cap wall 178 extends rearwardly toward the occupant seat and is sewn to the bag base wall 168 at stitches 182, thereby defining a left side baffle portion 180 and a right side baffle portion 181 on opposite sides of the stitches 182. The left and right cap sidewalls 172 and 174 are respectively sewn to the adjacent air bag sidewalls 184 and 186 or to the bag base wall 168 by stitches at 190 and 192. Thus, as seen in FIG. 6, the outer peripheral edges of the box-shaped cap portion 164 are sewn to the air bag so that the flow of inflation gas is divided into left and right flow streams 85 and 87 and directed downwardly into the lower torso restraining portion 49 of the air bag, while prevented from flowing directly to the upper torso restraining portion of the air bag 160. The box-shaped cap portion 164 may have one or more vent holes in its surface to provide an additional vent path if needed. In addition, the box-shaped cap portion 164 can also be sewn at its perimeter to the base wall 168.

Figure 7:
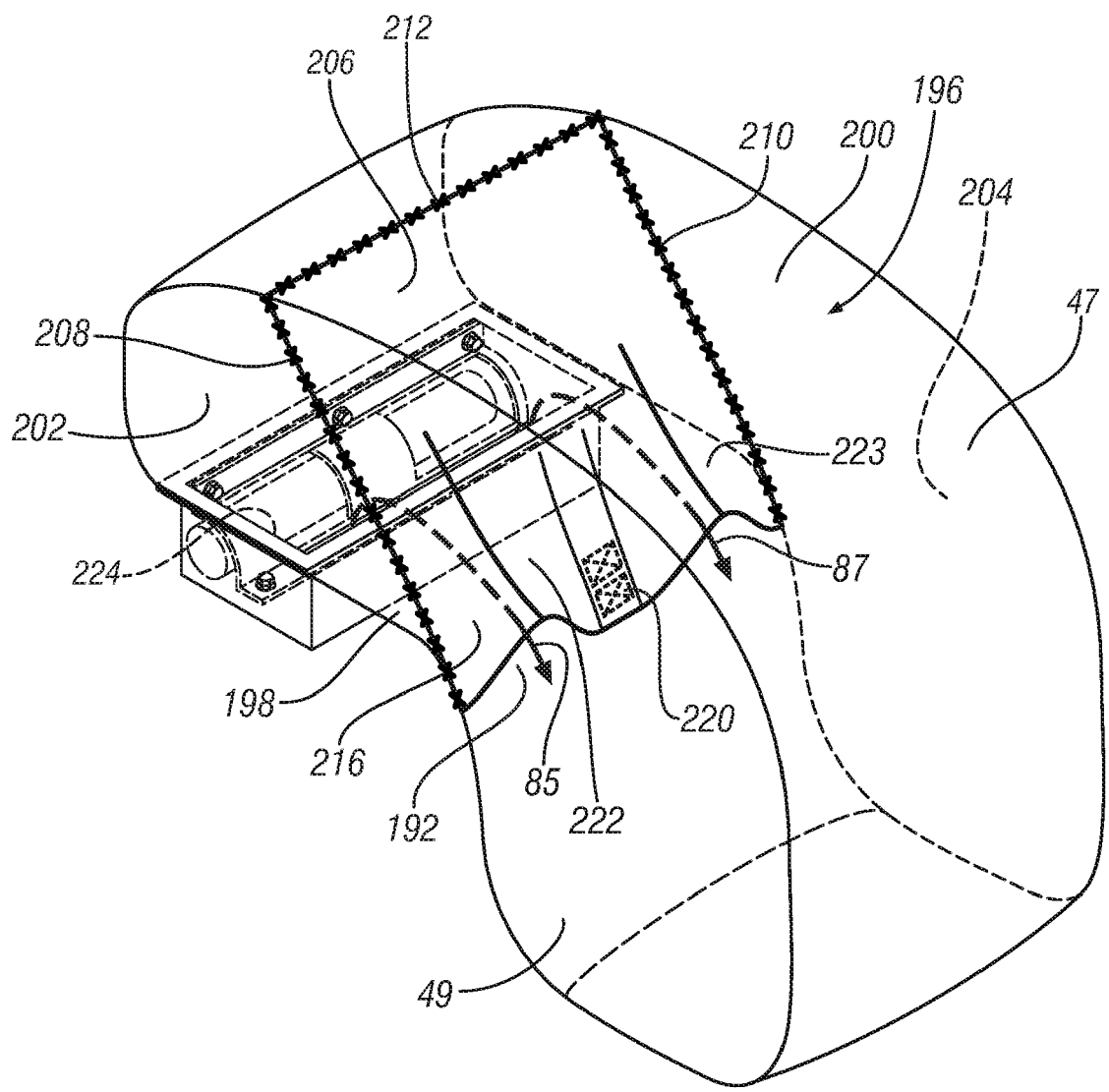
FIG. 7 shows another embodiment of the invention.

FIG. 7 shows another embodiment of the invention where air bag 196 has a bag base wall 198, top wall 200, and left and right sidewalls 202 and 204. Internal baffle 206 is a sheet of fabric having baffle side edges 208 and 210 sewn to the sidewalls 202 and 204, a forward end 212 sewn to top wall 200. A rearward end portion 216 of the baffle 206 is sewn at its center to the bag base wall 198 rearwardly of the inflator housing at stitches 220, thereby defining a left side baffle portion 222 and a right side baffle portion 223 on opposite sides of the stitches 220. As seen in FIG. 7, the baffle 206 overlies the mouth 224 of the air bag 196 and angles downwardly toward the lower torso restraining portion 49 to divide the inflation gas into a left flow stream 85 and a right flow stream 87, and to direct the inflation gas downwardly and rearwardly into the lower torso restraining portion 49. Internal baffle 206 may have one or more vent holes in its surface to provide an additional vent path if needed.

Figure 8:
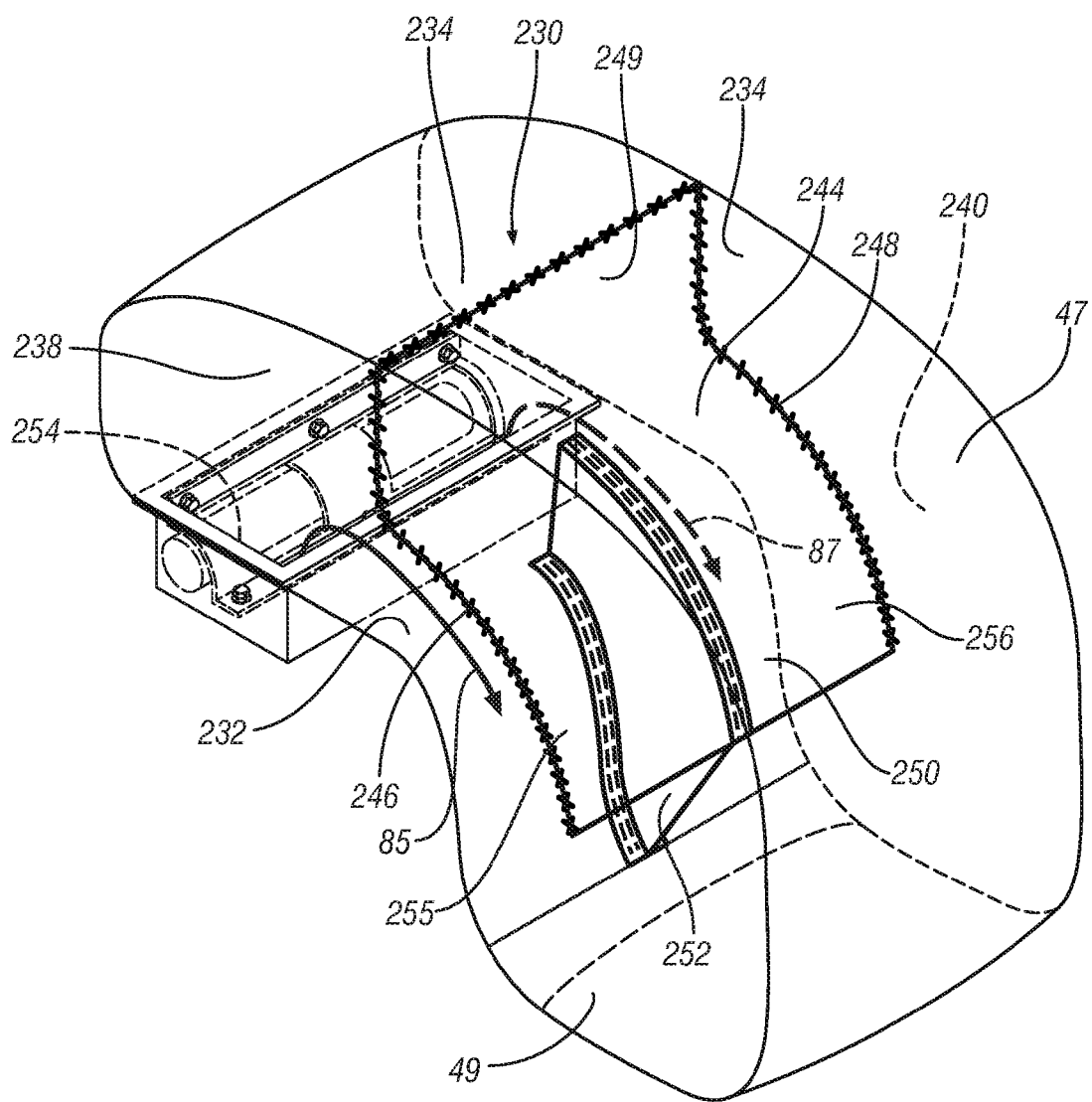
FIG. 8 shows another embodiment of the invention.

FIG. 8 shows another embodiment of the invention where air bag 230 has bag base wall 232, top wall 234, and left and right sidewalls 238 and 240. Internal baffle 244 is a sheet of fabric having baffle side edges 246 and 248 sewn to the sidewalls 238 and 240, a forward end 249 sewn to top wall 234. A rearward end portion 250 of the baffle 244 is sewn at its center to a vertical dividing panel 252 that is sewn to the bag base wall 232 rearwardly of the mouth 254 of the air bag 230. Thus the baffle 244 has a left side baffle portion 255 and a right side baffle portion 256. Accordingly, the vertical dividing panel 252 divides the inflation gas into left and right flow streams 85 and 87, and the baffle 244 directs the inflation gas flow downwardly into the lower torso restraining portion 49 of the air bag 230. Internal baffle 244 may optionally have one or more vent holes in its surface to provide an additional vent path if needed.

Thus it is seen that the internal baffle may be oriented and angled and sized as desired to effectively optimize the division of the inflation gas flow into left and right flow streams that direct the inflation first into the lower torso restraining portion of the air bag 30.

What is claimed is:

1. An inflatable air bag receiving inflation gas from an inflator mounted on an instrument panel to inflate the air bag in the region between a windshield and the instrument panel and a seated occupant, comprising:
    a bag base wall having a mouth registering with the inflator and extending rearward along the instrument panel and toward the seated occupant and extending further rearward and downwardly;
    spaced apart left and right sidewalls that connect the bag base wall with a top wall and an occupant facing wall thereby defining an upper torso restraining portion of the inflated air bag for restraining an occupant upper torso and a lower torso restraining portion for restraining an occupant lower torso;
    and an internal baffle provided within the air bag and being a flap of material having a baffle base wall sewn to the bag base wall rearwardly of the mouth and a left side baffle portion and a right side baffle portion attached to and extending from the baffle base wall respectively to the left and right sidewalls of the air bag and attached respectively to the left and right sidewalls of the air bag so that the inflation gas impinges on the baffle and is divided into left and right flow streams flowing on opposite sides of the baffle base wall and directed downwardly into the lower torso restraining portion, said internal baffle also having an upright baffle wall that extends upright from the left and right side baffle portions and is attached to the top wall and left and right sidewalls of the air bag to block the flow of inflation gas directly into the upper torso restraining portion, whereby the flow of inflation gas from the inflator into the air bag is accomplished via the left and right flow streams downwardly into the lower torso restraining portion and then from the lower torso restraining portion upwardly into the upper torso restraining portion.

2. The air bag of claim 1 further comprising said internal baffle having openings provided therein so that inflation gas can flow into the air bag both via the left and right flow streams and via the openings.

3. The air bag of claim 1 further comprising said internal baffle extending rearwardly to the occupant facing wall and being attached thereto so that the baffle acts as a tether to determine the position of the occupant facing wall.

4. The air bag of claim 1 further comprising said left side baffle portion and said right side baffle portion rising from the base wall and toward the left and right sidewalls of the air bag at an angle of about 45 degrees.

5. The air bag of claim 1 further comprising said base wall being attached to the bag base wall by a vertical extending wall that divides the inflation gas into a left flow stream and a right flow stream.

6. The air bag of claim 1 further comprising one or more vent openings provided in the internal upright baffle wall to permit a portion of the inflation gas to flow to the upper torso restraining portion without flowing through the left or right flow stream.

7. The air bag of claim 1 further comprising said baffle base wall and said left and right side baffle portions of the internal baffle extending rearwardly to the occupant facing wall and being attached thereto so that the internal baffle acts as a tether to determine the position of the occupant facing wall.

8. The air bag of claim 7 further comprising said left side baffle portion and said right side baffle portion rising from the base wall and toward the left and right sidewalls of the air bag at an angle of about 45 degrees.

9. The air bag of claim 7 further comprising one or more vent openings provided in the internal upright baffle wall to permit a portion of the inflation gas to flow to the upper torso restraining portion without flowing through the left or right flow stream.

10. The air bag of claim 7 further comprising said left and right side baffle portions of the internal baffle extending to but not being attached to the left and right sidewalls of the air bag so that upward flow of inflation gas from the lower torso restraining portion to the upper torso restraining portion is provided around the left and right side baffle portion not attached to the left and right sidewalls of the air bag.

11. The air bag of claim 10 further comprising said left side baffle portion and said right side baffle portion rising from the base wall and toward the left and right sidewalls of the air bag at an angle of about 45 degrees.

12. The air bag of claim 10 further comprising one or more vent openings provided in the internal upright baffle wall to permit a portion of the inflation gas to flow to the upper torso restraining portion without flowing through the left or right flow stream.

13. The air bag of claim 1 further comprising said baffle base wall and said left and right side baffle portions of the internal baffle extending rearwardly into a first attachment to the occupant facing wall to provide a first tether to determine the position of the occupant facing wall, and said baffle base wall and said left and right side baffle portions further extending into a second attachment with the occupant facing wall so that the positions of the occupant facing wall is determined for both the upper restraining portion and lower restraining portion of the air bag.

14. The air bag of claim 13 further comprising said left and right side baffle portions of the internal baffle extending to but not being attached to the left and right sidewalls of the air bag so that upward flow of inflation gas from the lower torso restraining portion to the upper torso restraining portion is provided around the left and right side baffle portion not attached to the left and right sidewalls of the air bag.

15. The air bag of claim 13 further comprising said left side baffle portion and said right side baffle portion rising from the base wall and toward the left and right sidewalls of the air bag at an angle of about 45 degrees.

16. The air bag of claim 13 further comprising one or more vent openings provided in the internal upright baffle wall to permit a portion of the inflation gas to flow to the upper torso restraining portion without flowing through the left or right flow stream.

17. An inflatable air bag receiving inflation gas from an inflator mounted on an instrument panel to inflate the air bag in the region between a windshield and the instrument panel and a seated occupant, comprising:
    a bag base wall having a mouth registering with the inflator and extending rearward along the instrument panel and toward the seated occupant and extending further rearward and downwardly;
    spaced apart left and right sidewalls that connect the bag base wall with a top wall and an occupant facing wall thereby defining an upper torso restraining portion of the inflated air bag for restraining an occupant upper torso and a lower torso restraining portion for restraining an occupant lower torso;

and an internal baffle provided within the air bag and being a flap of material having a baffle base wall sewn to the bag base wall rearwardly of the mount, said internal baffle having:

and a left side baffle portion and a right side baffle portion attached to and extending from the baffle base wall respectively to the left and right sidewalls of the air bag and attached respectively to the left and right sidewalls of the air bag so that the inflation gas impinges on the baffle and is divided into left and right flow streams flowing on opposite sides of the baffle base wall and directed downwardly into the lower torso restraining portion;

an upright baffle wall that extends upright from the left and right side baffle portions and is attached to the top wall and left and right sidewalls of the air bag to block the flow of inflation gas directly into the upper torso restraining portion, whereby the flow of inflation gas from the inflator into the air bag is primarily accomplished via the left and right flow streams downwardly into the lower torso restraining portion and then from the lower torso restraining portion upwardly into the upper torso restraining portion;

and one or more vent openings provided in the upright baffle wall to permit a portion of the inflation gas to flow to the upper torso restraining portion without flowing through the left or right flow stream into the lower torso restraining portion.

18. The air bag of claim 17 further comprising said left side baffle portion and said right side baffle portion rising from the base wall and toward the left and right sidewalls of the air bag at an angle of about 45 degrees.

19. An inflatable air bag receiving inflation gas from an inflator mounted on an instrument panel to inflate the air bag in the region between a windshield and the instrument panel and a seated occupant, comprising:

a bag base wall having a mouth registering with the inflator and extending rearward along the instrument panel and toward the seated occupant and extending further rearward and downwardly from the instrument panel;

spaced apart left and right sidewalls that connect the bag base wall with a top wall and an occupant facing wall thereby defining an upper torso restraining portion of the inflated air bag for restraining an occupant upper torso and a lower torso restraining portion for restraining an occupant lower torso;

and an internal baffle provided within the air bag and being a flap of material having a baffle base wall sewn to the bag base wall rearwardly of the mount, said internal baffle having:

and a left side baffle portion and a right side baffle portion attached to and extending from the baffle base wall respectively to the left and right sidewalls of the air bag and attached respectively to the left and right sidewalls of the air bag so that the inflation gas impinges on the baffle and is divided into left and right flow streams flowing on opposite sides of the baffle base wall and directed downwardly into the lower torso restraining portion;

an upright baffle wall that extends upright from the left and right side baffle portions and is attached to the top wall and left and right sidewalls of the air bag to block the flow of inflation gas directly into the upper torso restraining portion, whereby the flow of inflation gas from the inflator into the air bag is primarily accomplished via the left and right flow streams downwardly into the lower torso restraining portion and then from the lower torso restraining portion upwardly into the upper torso restraining portion;

one or more vent openings provided in the upright baffle wall to permit a portion of the inflation gas to flow to the upper torso restraining portion without flowing through the left or right flow stream into the lower torso restraining portion;

and said baffle base wall and said left and right side baffle portions of the internal baffle extending rearwardly to the occupant facing wall and being attached thereto so that the internal baffle acts as a tether to determine the position of the occupant facing wall.

20. The air bag of claim 19 further comprising said left and right side baffle portions of the internal baffle extending to but not being attached to the left and right sidewalls of the air bag so that upward flow of inflation gas from the lower torso restraining portion to the upper torso restraining portion is provided around the left and right side baffle portion not attached to the left and right sidewalls of the air bag.

* * * * *